Patented June 26, 1945

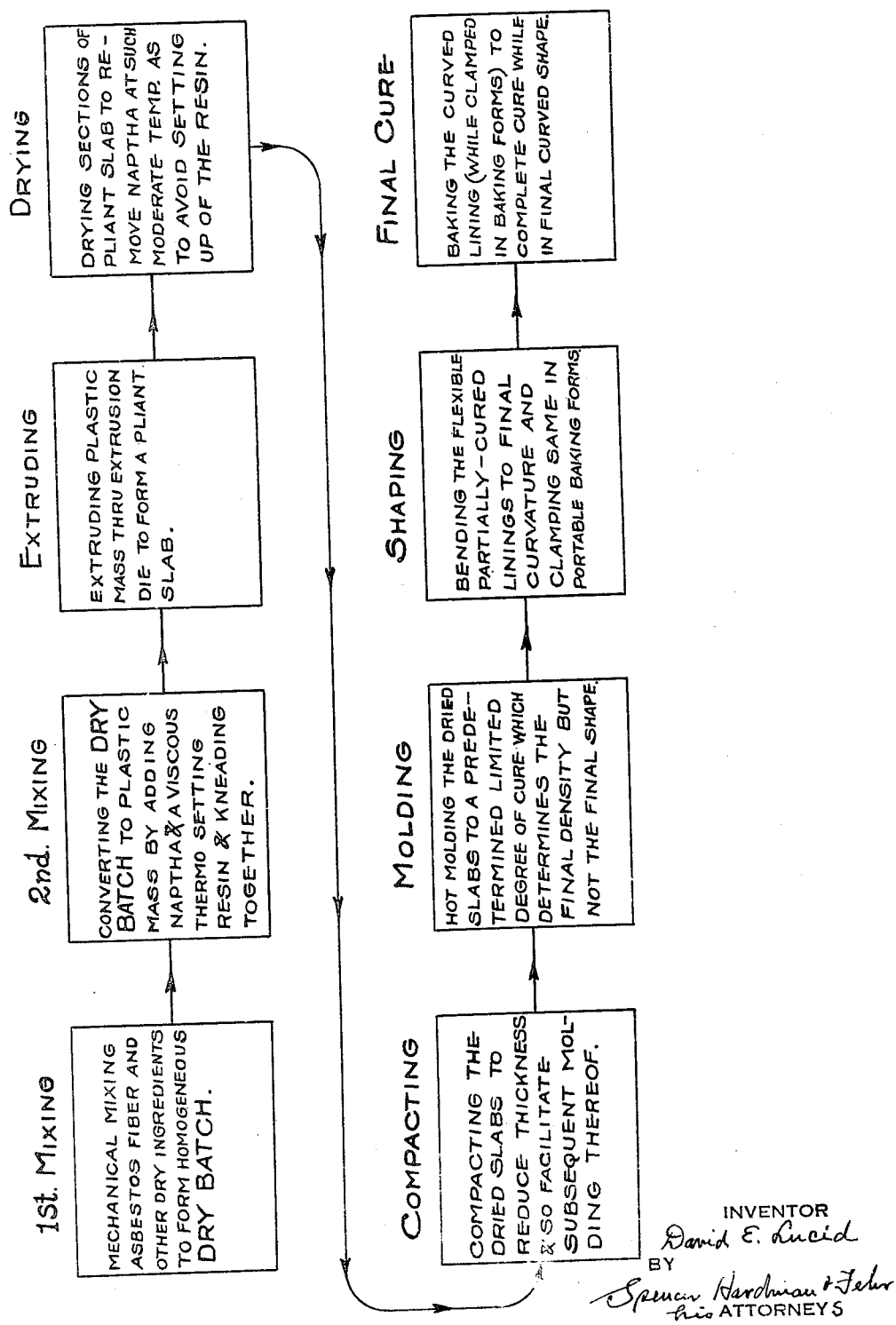

2,379,166

UNITED STATES PATENT OFFICE 2,379,166

METHOD OF MAKING FRICTION LININGS

David E. Lucid, Dayton, Ohio, assignor to General Motors Corporation, Detroit, Mich., a corporation of Delaware Application November 4, 1943, Serial No. 508,952

6 Claims. (Cl. 18—47.5)

This invention relates to a method of mixing and curing moldable thermosetting compounds, especially such as contain a substantial percentage of fiber ingredient and are suitable for making molded brake linings and clutch facings for automotive vehicles, and the like.

An object of this invention is to provide a method of making a readily extrudable compound from any suitable compound formula having as its main binder ingredient a viscous liquid thermosetting resin which renders the compound difficult to plasticize, such, for example as an oil-modified phenol-formaldehyde resin.

A moldable friction compound having rubber (either natural or synthetic) as the chief binder ingredient ordinarily can be readily uniformly mixed and kneaded into a plastic mass having such plastic characteristics that it can be readily extruded thru suitable extrusion dies. However when a phenol-formaldehyde resin, or any one of several other available similar thermosetting resins, is used instead of rubber as the main binder ingredient in a compound formula having a substantial percentage of fiber ingredient, the resulting mixture is not readily kneadable into a plastic mass which is adapted to be extruded thru extrusion dies. Hence with such compound formulas there arise two general problems, namely, (1) how to uniformly mix and disperse the compound ingredients, including a substantial percentage of asbestos or other fiber, into a homogeneous mixture, and (2) how to so plasticize such a compound as to render it suitable for extrusion thru an extrusion die. This invention is especially addressed to the solution of these two problems, as will appear hereinafter.

An important feature of the method of this invention is that of first mixing together the dry finely divided ingredients of the compound while still in dry condition to form a dry mix, and subsequently dampening this dry mix with gasoline or other volatile petroleum naptha to form a wet batch and thereafter kneading into such wet batch an oil-modified viscous liquid thermosetting resin binder. During such subsequent kneading in any suitable kneading machine the naptha serves to greatly aid in extending and dispersing the oil-modified viscous liquid resin and thereby greatly facilitates and expedites the conversion of the entire compound into a uniform plastic tacky mass. This will give the desired plastic characteristics to the entire compound and thus render it readily extrudable into slabs or other desired forms thru extrusion dies. The volatile naptha is readily removed by evaporation prior to any curing of the extruded compound. The term "naptha" as used herein includes gasoline and any other of variously-named volatile products obtained by the fractional distillation of petroleum and having an initial boiling point of about 110° F. and a dry end point of about 250° F.

An important feature of the method of this invention is that of getting rid of all the volatile naptha in the extruded compound prior to molding same under heat and pressure, by evaporating the naptha therefrom at such a temperature and for such a time period as will not cause any setting-up of the thermosetting resin in the compound. Preferably I use a naptha of such volatility that it can be efficiently evaporated by warming the extruded slabs (or other forms) in an oven at around 150° F. for a time period of several hours without causing any setting up of the thermosetting resin therein. By this method the dried extruded slabs (or other forms) are unexpectedly strong and readily retain their extruded shape even when roughly handled, hence they readily lend themselves for use as preforms for subsequent molding and curing under heat and pressure in any well-known suitable manner. The naptha should be completely evaporated prior to molding the slabs (or other forms) between heated press platens or in hot molds, otherwise the presence of the naptha in the compound during such molding would cause serious molding difficulties due to its high volatility and consequent blowing effect at the curing temperatures.

Another object of this invention is to provide an improved method of molding the above-mentioned dried extruded slabs, which method comprises the steps of molding and partially curing said slabs under pressure between heated platens of a press for a relatively short time period, and then quickly cooling the partially cured slabs by running cold water thru the platens (after the cure has progressed to the predetermined limited degree) while still maintaining high pressure on the platens. By thus rapidly cooling the partially cured slabs before releasing the molding pressure thereupon the desired limited degree of press cure can be accurately and quickly accomplished and still avoid any blistering of the molded surfaces, such as would otherwise occur due to a continued emergence or expansion of the hot gases in the partially cured molded article when the molding pressure is released. After such relatively short press cure which permanently sets up the material and gives it the high density desired in the final article, the final curing of the material is done by baking in a heated oven for a relatively long time period.

The accompanying drawing is a diagram of the successive steps which may be used in carrying out the process of this invention.

As a specific illustration of the general method of this invention I will now give a description of an illustrative compound formula and method used therewith for making a friction lining material which is suitable for brake linings or clutch facings of automotive vehicles.

*Compound formula No. A*

| | Pounds |
|---|---|
| 1. Short fiber asbestos | 71 |
| 2. Gilsonite (in powder form) | 2 |
| 3. Heat-resisting friction powder (derived from cashew liquid which is a high molecular weight phenol oil with an unsaturated side chain, obtainable from the outer-shell of the cashew nut) | 8 |
| 4. Barytes (barium sulphate) | 5 |
| 5. Oil-modified liquid thermosetting resin (binder) | 23 |
| 6. Gasoline 6 gals. (evaporated prior to molding) | |
| | 109 |

Oil-modified liquid thermosetting resins (item 5 in above formula) are well known and commercially available in the form of very viscous liquids. One such oil-modified liquid thermosetting resin suitable for use in the above formula has therein as so-called "solids" about 40% of phenol-formaldehyde resin (together with a suitable amount of accelerator) modified with about 60% of blown linseed oil and/or castor oil. Such "solids" are dissolved in benzol (or other suitable solvent) to form a very viscous solution having about 70% of such "solids" therein. Similar oil-modified viscous liquid resins are now being made by various manufacturers and a method of making same is disclosed in Patent No. 1,887,833, dated November 15, 1932, to L. C. Byck.

Synthetic resins other than a phenol-formaldehyde resin may be oil-modified such, for example, as: (1) para-cresol-formaldehyde resin, (2) ortho-cresol-formaldehyde resin, and (3) 1, 3, 5-xylenol-formaldehyde resin, or various combinations of these three. However it is to be understood that the methods claimed in this application are not limited to nor particularly concerned with how the oil-modified viscous liquid resin may be made so long as its physical and chemical characteristics are such as to render it useable to advantage according to the teachings and principles of this invention.

Items 1 to 4 inclusive of formula A (above) are all dry constituents, and these are first thoroly mixed together in a suitable mixing machine which will fluff and mix the asbestos fiber with the other ingredients and form a substantially homogeneous dry batch. Preferably the mixing machine is started empty and the asbestos fiber is then all gradually fed therein and fluffed up by the mixer. All the remaining dry powder ingredients should be first screened thru a 10–20 mesh screen to break up any lumps therein. These dry ingredients are then gradually added to the fluffed asbestos fiber in the mixer and the mixing continued for about 30 minutes, or until all the ingredients are substantially uniformly mechanically mixed thruout the dry batch.

This dry batch is then transferred to a mixing machine of a type suitable for mixing plastic material (such as a dough-mixer) and enough gasoline added thereto to wet all the asbestos fibers and powdered materials. Preferably only sufficient gasoline should be added as will be fully absorbed by the dry materials without said materials becoming dripping wet, that is, the asbestos fibers should be sufficiently dampened as to substantially cover all the fibers with an adhering film of gasoline and to cause the fibers to cling together somewhat when a handful is squeezed together with the fingers but with no liquid gasoline dripping therefrom. To the weight of dry materials given in above Formula A there should be added about 6 gallons of gasoline to give the preferred degree of dampening of the dry batch.

The oil-modified liquid thermosetting resin (item 5 in above Formula A) is then added to the dampened batch in the dough mixer and thoroughly worked into the materials by the kneading paddles of the mixer for a sufficient time period to give a thorough dispersion of the liquid resin with the other materials in the mixer. The adhering film of gasoline on the fibers and other solid particles of the mix serves as a wetting agent and extender for the oil-modified viscous liquid resin and very greatly facilitates its rapid dispersion throughout the asbestos fibers so as to provide a uniform tacky mass of suitable consistency for die extrusion by means of an ordinary extruding machine of screw or ram type. In the example given above, such uniform dispersion is obtained in from 5 to 20 minutes of operation of the dough mixer.

This plastic compound is then placed into the extruding machine and extruded thru a die into a continuous pliant slab whose width and thickness is determined as desired by the corresponding dimension of the aperture in the extrusion die. Preferably the continuous slab, as it passes from the extrusion die, is cut off into convenient lengths to facilitate handling and laid upon flat perforated metal plates or other sustaining supports and removed to the drying oven in order to evaporate the gasoline therefrom.

These slabs remain in the drying oven maintained at such a temperature and for such a time period as will fully evaporate the gasoline, which at this stage has already performed its important dispersing function as described above and must be removed. The drying oven temperature should not be so high as to cause any setting up of the thermosetting resin, and preferably should be within the distillation range of the gasoline (or other petroleum naptha) used as the dispersing agent. In the example given above, the oven temperature preferably is about 150° F. and the time period about 16 hours, in order to insure the complete but rather gradual evaporation of the gasoline. If the gasoline is evaporated too rapidly difficulties such as blowing will be caused by the too rapid escape of the gasoline vapors from the slab material while it is being dried in the oven. The dried slabs come from the oven as fairly strong self-retaining boards which can be readily handled without danger of marring or breaking same. Hence such dried slabs (or any other similarly extruded sections) are well adapted for use as preforms for subsequent molding under heat and pressure by any well-known molding method.

Preferably these dried slabs after being taken from the oven are given a preliminary densification by compressing same either in a hot press, cold press, or between pressure rolls, without subjecting the slabs to sufficient heat to cause any setting up of the thermosetting resin therein. The main purpose of any such preliminary densification of the slab is to facilitaate the subsequent molding operation thereupon.

For making automobile brake linings from such dried slabs, I preferably proceed as follows, to complete the illustrative example. A dried slab is inserted between two preferably unheated platens of a molding press and the press closed thereupon at a pressure of about 1075 lbs. per sq. in. for a period of about ½ minute. This high pressure for only a short time period serves to highly compact and increase the density of the material without causing any setting up of the thermosetting resin therein. The slab is then removed and inserted between two hot platens of a molding press at 300° F. and molded at a pressure of 235 lbs. per sq. inch for a five minute period, followed immediately by increasing the pressure to 1075 lbs. per square inch for a five minute period, the platens remaining heated to 300° F. during this ten minutes of curing. The relatively low molding pressure during the first five minute period prevents any excessive tendency of the binder resin to flow to the outer surfaces of the slab before the resin begins to stiffen and set up under the applied heat. Any tendency of the binder resin to flow to the outer surfaces of the slab can be materially increased or decreased simply by increasing or decreasing somewhat the molding pressure during the first 5 minute period to give the desired result as determined by trial tests. The thermosetting resin binder is set up but still only partially cured after said ten minutes with the platens heated to 300° F., but this imparts to the slab the final desired maximum density.

The platens are then quickly cooled down to near room temperature by running cold water thru the platens while still maintaining the high pressure of 1075 lbs. per square inch thereupon. This cooling period normally requires only from 2 to 5 minutes, after which the pressure upon the platens is immediately released and the slabs removed from the press. Such rapid cooling of the partially cured slab while it is still under high pressure immediately stops any further formation of gases or vapors in the slab material as a result of chemical reaction at this stage of curing. Hence such rapid cooling under high pressure prevents blistering on the surface of the slab (or other possible difficulties such as warping of the slab), which otherwise would be caused by expansion of gases in the material if the slab be released from pressure while still hot.

The permanently compacted but nevertheless somewhat flexible and only partially cured slabs, after removal from the press, are then cut up into pieces having the desired length and width to form the individual brake linings, and these flat pieces are preferably then ground down to the desired final thickness. These pieces are preferably first warmed for a period of one-half to five minutes at about 250° F. to 300° F. in order to render them somewhat more flexible and are then bent into the correct arcuate form desired in the brake linings by tightly clamping them in suitable portable curved baking forms. These forms retain the individual linings tightly clamped in correct arcuate form between curved metal surfaces all during their final curing period, which may be from 3 to 6 hours at a curing temperature of from 300° F. to 600° F., a typical cure being 3 hours at 400° F. This relatively slow final cure is efficiently done in a baking oven and is of course many times longer than the above described ten minute curing period in the molding press. A baking oven can be readily made large enough to cure a very large number of pieces at the same time, whereas a single relatively expensive molding press can handle sufficient material for only several brake linings during one curing period. After baking at such temperature and for such time period as to finally cure the thermosetting resin, the curved brake lining pieces are preferably allowed to cool to nearly room temperature while still retained tightly clamped in the portable baking forms, which provides more uniform cooling and causes them to more accurately retain their correct shape upon removal from the baking forms. After removal from the forms the pieces may have suitable rivet holes drilled therein whereby said linings may be riveted to metal brake shoes, according to usual practice.

If desired, the partially cured linings may be directly bonded to the metal brake shoes simultaneously with the above-described final curing or baking operation. This can be accomplished by the following steps. The convex outer surface of the brake shoe to which the lining is to be secured is sand blasted or shot blasted in order to clean and roughen same. This outer surface is then sprayed or painted with a very thin coating of a 50% solution of phenol-formaldehyde resin (in the A stage of polymerization) and alcohol. This thin coating should be about half a thousandth of an inch thick for automobile brake shoes. The above-described partially cured and ground flat pieces of brake lining are first warmed to increase their flexibility and each lining is then bent around and very tightly clamped directly upon the resin-coated convex surface of the brake shoe by means of an overlying flexible spring steel band. Such clamping is preferably done in a suitable portable clamping device within which the brake shoe is inserted and properly located, and which is provided with suitable means for bending the brake lining around the convex surface of the shoe and also means for tightly clamping the overlying steel band down upon the curved lining so as to give a high uniform radial pressure thereupon. This portable assembly is then placed in the baking oven as described above, so that while the lining itself is being finally cured the thin resin coating on the convex surface of the shoe will be simultaneously cured and very strongly bond the lining directly to the shoe. A typical time period and temperature for such a final cure in the baking oven is 3 hours at 400° F.

It is to be understood that the above Formula A is given only as an illustrative example of a compound to which the methods of this invention are adapted. By means of this invention thermosetting resins may be readily uniformly mixed with a larger percentage of fiber and various other ingredients and converted into a tacky plastic mass which can be readily extruded thru extrusion dies.

Illustrative examples of other compound forulas for making brake linings according to the method of this invention are as follows:

*Compound formula No. B*

| | Pounds |
|---|---|
| Short asbestos fiber | 71.00 |
| Oil-modified liquid thermosetting resin | 23.00 |
| Gilsonite (in powder form) | 2.00 |
| Heat-resisting friction powder derived from cashew liquid | 8.00 |
| Barytes | 5.00 |
| Hexamethylene-tetramine (accelerator) | 1.00 |
| | 110.00 |
| Petroleum naptha _____ gallons | 6.00 |

*Compound formula No. C*

| | Pounds |
|---|---|
| Short asbestos fiber | 72.00 |
| Barytes | 10.00 |
| Gilsonite (in powder form) | 3.00 |
| Graphite | 14.00 |
| Oil-modified liquid thermosetting resin | 24.00 |
| | 123.00 |
| Petroleum naptha _____ gallons | 6.00 |

*Compound formula No. D*

| | Pounds |
|---|---|
| Short asbestos fiber | 70.00 |
| Gilsonite (in powder form) | 2.00 |
| Barytes | 5.00 |
| Heat-resisting friction powder derived from castor oil | 8.00 |
| Oil-modified liquid thermosetting resin | 23.00 |
| | 108.00 |
| Petroleum naptha _____ gallons | 6.00 |

While the specific methods of the present invention as herein disclosed, constitute preferred methods, it is to be understood that those skilled in the art may vary therefrom in various respects without departing from the principles of this invention as defined by the claims which follow.

What is claimed is as follows:

1. The steps in the method of making a friction lining from a fiber-containing compound having an oil-modified thermosetting resin as a binder, comprising: first mixing together the fiber ingredient with other finely divided dry filler ingredients of the compound to form a dry batch, dampening said dry batch throughout by the addition of a volatile petroleum naptha, then adding thereto an oil-modified liquid thermosetting resin and kneading the resulting conglomerate until the entire mixture becomes a plastic tacky mass of suitable consistency for die-extrusion, extruding said plastic tacky mass thru a die to form a slab, then evaporating the naptha from said extruded slab at a temperature insufficient to cause a setting up of the thermosetting resin, and subsequently compacting and at least partially curing said dried slab material under heat and pressure.

2. The steps in the method of making a molded article from a fiber-containing thermosetting compound, comprising: first preparing a dry batch by mixing the fiber ingredient with other dry filler ingredients in finely divided form until said ingredients are thoroughly mixed, then wetting the dry batch thus obtained with a volatile naptha, then adding to this wet batch an oil-modified liquid thermosetting resin and kneading until the entire mixture becomes a tacky plastic mass of suitable consistency for die extrusion, extruding a blank from said tacky mass, removing the naptha from said blank by drying at a temperature insufficient to set up the thermosetting resin, compressing said dried blank to reduce its volume and increase its density, and thereafter partially curing said blank for a time period of the order of 5 to 15 minutes under such pressure and temperature as to permanently set up the resin and thereby retain the blank in highly compacted condition.

3. The steps in the method of making a molded article from a fiber-containing thermo-setting compound, comprising: first preparing a well-mixed dry batch of the fibers and other dry ingredients of the compound, dampening said dry batch thruout by adding a volatile naptha thereto, then adding an oil-modified liquid thermosetting resin to the dampened batch and kneading until the liquid resin is substantially uniformly dispersed therein to form a plastic tacky mass, extruding said tacky mass thru an extrusion die to form an extruded blank of any predetermined cross section, then evaporating the naptha from the extruded blank at a temperature below the normal curing temperature of the thermosetting resin therein, thereafter molding and partially curing the dried blank under heat and pressure for a relatively short time period sufficient to permanently set up the thermosetting resin therein, then quickly cooling the partially cured molded form while still maintaining molding pressure thereupon.

4. The steps in the method of making a molded article from a fiber-containing thermosetting compound, comprising: first preparing a well-mixed dry batch of the fibers and other dry ingredients of the compound, dampening said dry batch thruout by adding a volatile naptha thereto, then adding an oil-modified liquid thermosetting resin to the dampened batch and kneading until the liquid resin is substantially uniformly dispersed therein to form a plastic tacky mass, extruding said tacky mass thru an extrusion die to form an extruded blank of predetermined cross section, then evaporating the naptha from the extruded blank at a temperature below the normal curing temperature of the thermosetting resin therein, thereafter compacting and partially curing the dried blank under heat and pressure between the heated platens of a molding press for a time period of the order of 5 to 15 minutes, then quickly cooling the partially cured molded form without releasing the molding pressure of the press thereupon, then removing the partially cured form from the press and subsequently completing the cure thereof in a heated oven for a time period of the order of several hours.

5. The steps in the method of making a friction lining from a compound containing a large percentage of asbestos fiber and having an oil-modified thermosetting resin binder, comprising: preparing the compound in such plastic condition as to render it suitable for die extrusion by first mixing together the fiber ingredient with other dry finely divided filler ingredients of the compound to form a well-mixed dry batch and thereafter converting said dry batch into a tacky mass by adding to said dry batch a volatile petroleum naptha and a viscous oil-modified thermosetting resin and then kneading while the naptha serves to extend and disperse said viscous resin uniformly thruout the fibrous mass, extruding said tacky mass thru a die to thereby form a pliant slab having substantially smooth uniform surfaces and uniform sectional dimensions as determined by the dimensions of the extrusion aperture, then getting rid of the naptha by evaporating the naptha from said extruded slab at such a low temperature as will not cause the thermosetting resin therein to set up and thereby form a self-supporting but uncured preform, and subsequently molding said preform under heat and pressure.

6. The steps in the method of making a molded article from a compound containing a large percentage of fiber and having an oil-modified thermosetting resin binder, comprising: first mixing together the fiber ingredient with other finely divided dry filler ingredients to form a dry batch, thereafter converting said dry batch into a tacky plastic mass by adding a volatile petroleum naptha and a viscous oil-modified thermosetting resin and kneading while the naptha acts as a dispersing agent for said viscous resin and thereby greatly facilitates the dispersion of said viscous thermosetting resin thruout the fibrous mass, extruding said tacky plastic mass thru a die to thereby form a relatively soft and pliant blank having substantially smooth surfaces and uniform section as determined by the dimensions of the extrusion aperture, then evaporating the naptha from said pliant blank at such low temperature as will not set up the thermosetting resin and thereby form an uncured but relatively rigid and self-supporting preform, and subsequently molding said preform under heat and pressure.

DAVID E. LUCID.